United States Patent [19]

Pientka et al.

[11] Patent Number: 5,760,559
[45] Date of Patent: Jun. 2, 1998

[54] APPARATUS FOR OPERATING A WINDSHIELD WIPER

[75] Inventors: Rainer Pientka, Archern; Henry Blitzke, Buehl; Joerg Buerkle, Offenburg, all of Germany

[73] Assignee: Robert Bosch GmbH, Stuttgart, Germany

[21] Appl. No.: 655,447

[22] Filed: May 30, 1996

[30] Foreign Application Priority Data

May 31, 1995 [DE] Germany ............ 195 19 891.3

[51] Int. Cl.⁶ ............................................. B60S 1/08
[52] U.S. Cl. ................ 318/483; 318/444; 318/DIG. 2
[58] Field of Search ............................. 318/443–444, 318/DIG. 2, 445–7, 449–50, 466–478, 483; 15/250.001, 250.48

[56] References Cited

U.S. PATENT DOCUMENTS

| | | | |
|---|---|---|---|
| 3,832,567 | 8/1974 | Jacques et al. | 307/88.3 |
| 3,947,131 | 3/1976 | Karl | 356/209 |
| 4,542,325 | 9/1985 | Kobayashi et al. | 318/444 |
| 4,798,956 | 1/1989 | Hochstein | 250/341 |
| 5,252,898 | 10/1993 | Nolting et al. | 318/444 |
| 5,276,388 | 1/1994 | Levers | 318/444 |

FOREIGN PATENT DOCUMENTS 3314770  10/1984  Germany.

*Primary Examiner*—David S. Martin
*Attorney, Agent, or Firm*—Spencer & Frank

[57] ABSTRACT

An apparatus for operating a windshield wiper having a sensor device for determining the state of wetness of a windshield, an evaluation device which receives the sensor signal, a dirt-recognition stage and an adjusting device for updating a reference value when dirt is present on the windshield, and an actuating unit for the windshield wiper which can be actuated by the evaluation device in order to initiate a wiping process if the difference between the reference value and a current measured value of the sensor signal exceeds a predetermined threshold value. The measured values can be evaluated by the dirt-recognition stage with respect to signal breaks of the sensor signal caused by the wiping action of the wiper across the sensor surface.

7 Claims, 2 Drawing Sheets

FIG. 1
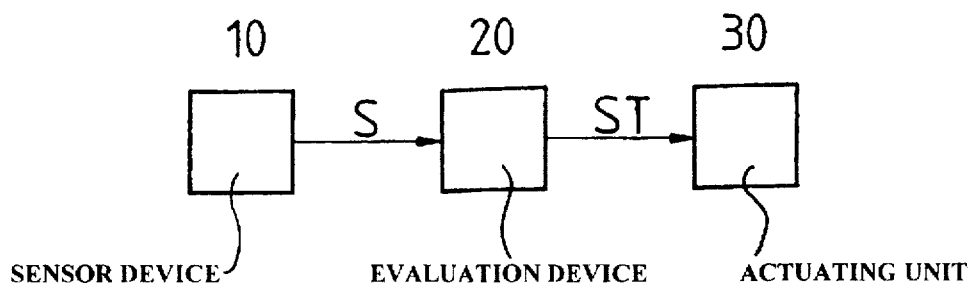
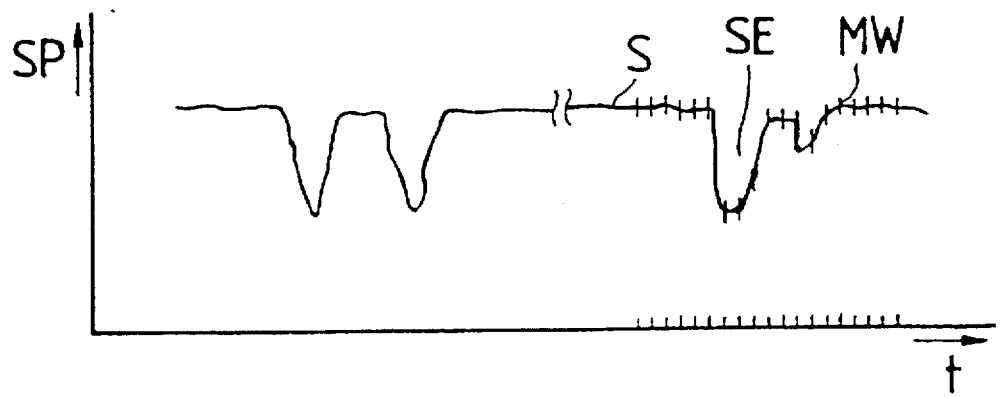
FIG. 2A
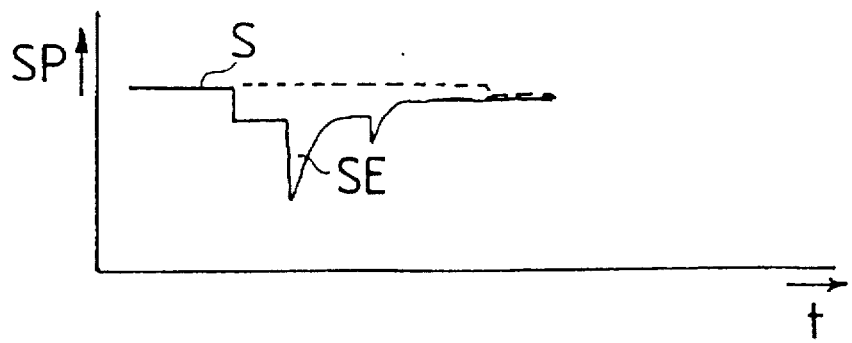
FIG. 2B
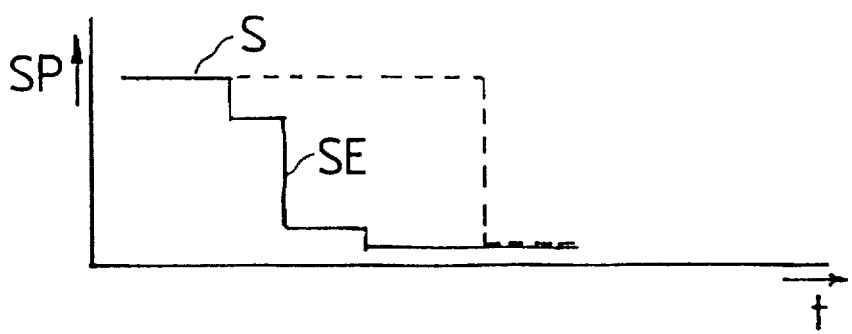
FIG. 2C

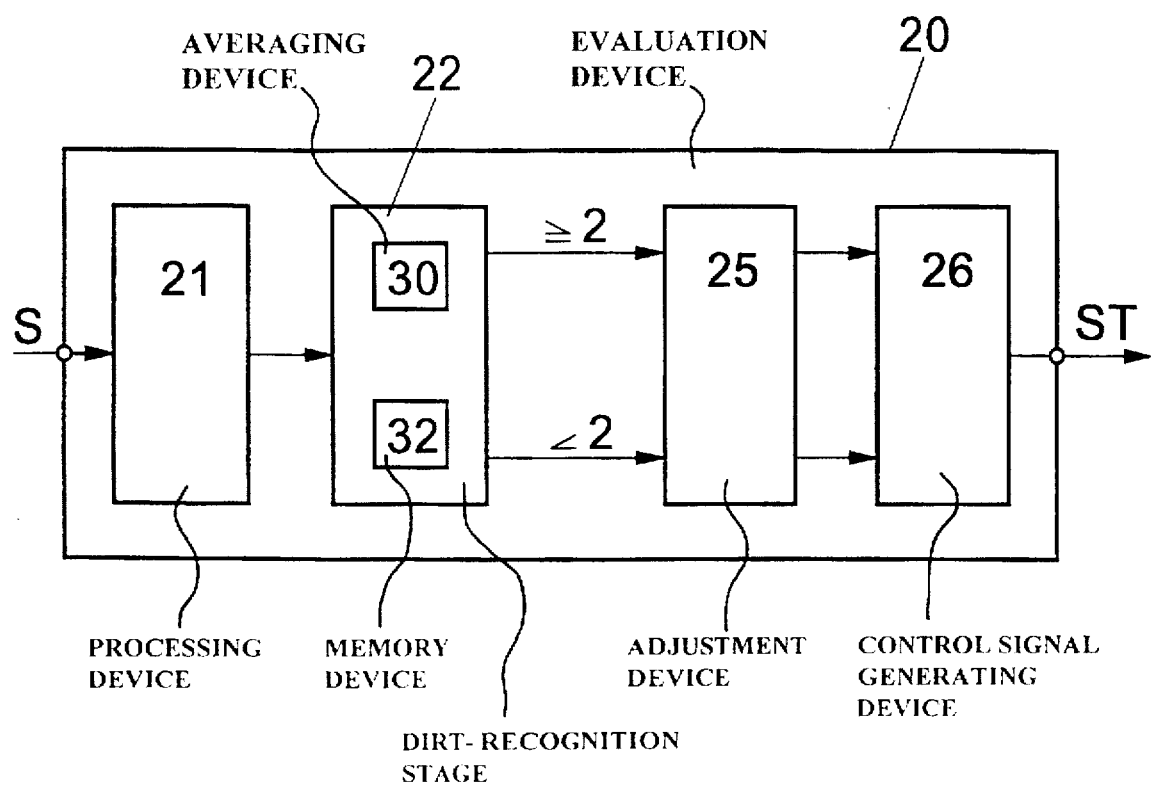

5,760,559

1

APPARATUS FOR OPERATING A WINDSHIELD WIPER

CROSS-REFERENCE TO RELATED APPLICATION

This application claims the priority of application No. 19519891.3-32 filed in Germany on May 31, 1995, the subject of that application being incorporated herein by reference.

BACKGROUND OF THE INVENTION

The present invention relates to an apparatus for operating a windshield wiper, the apparatus having a sensor device for determining the state of wetness of a windshield, an evaluation device which receives the sensor signal, a dirt-recognition stage, an adjustment device for updating a reference value when dirt is present on the windshield, as well as an actuating unit for the windshield wiper which can be actuated by the evaluating unit in order to initiate a wiping process if the difference between the reference value and a current measured value of the sensor signal exceeds a predetermined threshold value.

An apparatus of this type is shown in German Patent 33 14 770 A1, in which the state of wetness of a windshield is automatically determined by means of a sensor device, and the wiping operation is triggered with an evaluation device if the difference between a reference value and the sensor signal exceeds a predetermined threshold value. If soiling occurs on the windshield that cannot be eliminated by the wiper, this, too, is recognized; the time constant, however, is an order of magnitude of a few minutes, so that a number of unnecessary wiping processes can be triggered during this time. After a few minutes have passed, the reference value is adjusted to the new conditions caused by the dirt on the windshield, after which unnecessary wiping processes can be avoided.

SUMMARY OF THE INVENTION

It is an object of the present invention to provide an apparatus of the above-described type with which the triggering of wiping processes can, within a short period of time, be adapted to the new conditions whenever soiling of the windshield occurs.

This object is accomplished by an apparatus for operating a windshield wiper which includes a sensor device for determining the state of wetness of a windshield, an evaluation device which receives the sensor signal, a dirt-recognition stage and an adjusting device for updating a reference value when dirt is present on the windshield, and an actuating unit for the windshield wiper which can be actuated by the evaluation device in order to initiate a wiping process if the difference between the reference value and a current measured value of the sensor signal exceeds a predetermined threshold value. According to the preset invention the measured values can be evaluated by the dirt-recognition stage with respect to signal breaks of the sensor signal caused by the wiping action of the wiper across the sensor surface.

Thanks to the above arrangement, the measured values can be evaluated by the dirt-recognition stage with respect to breaks in the sensor signal caused by the wiping action of the wiper on the sensor surface. Consequently, the dirt-recognition stage evaluates the sensor signal with respect to dirt that is present, making use of the signal breaks resulting from the wiping action of the wiper on the sensor surface. It

2 has been found that, during a wiping process, dirt or, similarly, light rain is distributed over the sensor surface in such a way that only one more clear signal break, or no clear signal break, is caused by the wiping action of the wiper on the sensor surface. These types of occurrences of wetness are understood to constitute dirt. Based on this information, only one wiping process can be initiated in response to soiling of the windshield, so that subsequent unnecessary wiping processes can be avoided.

The simple possibility to detect signal breaks caused by the wiping action of the wiper is based on the fact that a break in the sensor signal can be detected if a current measured value exceeds a threshold value with respect to a reference value, and that information regarding the present dirt is then imparted if less than two signal breaks can be counted during a wiping process. The result is a reliable reference value for the magnitude of the difference from a current time in that the reference value is formed by an averaging device from a plurality of measured values preceding the current measured value.

A reliable statement regarding whether signal breaks caused by the wiping action of the wiper on the sensor surface are present, or are extensively or completely suppressed due to dirt, is attained in the following way. A signal break that is determined based on the exceeding of the threshold difference value can continue to be continuously evaluated with respect to its surface in comparison to the reference value extending as a straight horizontal line, and the signal break is evaluated as valid if the surface exceeds a predetermined reference surface value.

A simple possibility of providing the reference value at a given time ensues when a memory device is provided in which the average value can be stored as a reference value as soon as a signal break determined by the exceeding of the threshold difference value occurs.

The surface can be determined simply if it is calculated with the use of a defined number of measured values.

In order to adapt the wiping operation to the external conditions stipulated by dirt, the apparatus is advantageously configured such that the reference value can be adapted to the current signal level of the sensor signal by means of the adjusting device if less than two signal breaks are recognized. On the one hand, unnecessary wiping processes can be suppressed with the adapted reference value and, on the other hand, a wetting of the windshield which makes wiping necessary can trigger appropriate wiping operation.

BRIEF DESCRIPTION OF THE DRAWINGS

FIG. 1 shows a block representation of the apparatus.

FIGS. 2A through 2C show signal courses of a sensor signal over time.

FIG. 3 shows in more detail the evaluating unit of FIG. 1, including the essential circuit component.

DESCRIPTION OF THE PREFERRED EMBODIMENT

FIG. 1 shows an apparatus for automatically operating a windshield wiper, the apparatus including a sensor device 10 which transmits a sensor signal S to an evaluation device 20. The sensor signal S can be pre-processed. At its output, the evaluation device 20 supplies a control signal ST, with which wiping operation is initiated by an actuating unit 30.

FIGS. 2A through 2C show cutout views of different sensor signals S over time t, as they would occur with dirt or light wetness, so that these types of wetness conditions are presently understood generally as dirt.

In accordance with FIG. 2A, the signal level SP of the sensor signal first exhibits two signal breaks following relatively closely one behind the other and having approximately the same depth. These breaks occur when the windshield wiper passes back and forth across the sensor signal surface. As the course continues, again two signal breaks SE can be seen, which can be attributed to the wiping of the wiper. However, in this phase only the first signal break has a markedly deep course under normal wiping conditions, while the second signal break is only relatively weak. Experiments have shown that a weak second signal break of this type can be attributed to a soiling of the windshield or a significantly smaller quantity of water during the return motion of the wiper, for example due to light rain, e.g. if the dirt is distributed on the windshield by the passing wiper, and is hardly noticeable in the signal course during the return motion of the wiper. Under some conditions, even both signal breaks SE can be considerably weakened or even completely unrecognizable.

FIG. 2B shows a typical signal course for light rain, and FIG. 2C shows the signal course for dirt which is difficult to remove; in contrast to FIG. 2A, the first two signal breaks are not shown. During light rain, the sensor signal S rises again, but the second signal break is only weak, whereas with hard-to-remove dirt the return motion of the sensor signal S is maintained or is even amplified during the second wipe. FIGS. 2B and 2C also show, in dashed lines an adjustment of the reference.

This effect of dirt present on the windshield is utilized in the present case to recognize a state of soiling and to prevent a possibly unnecessary subsequent wiping operation.

The essential components of the evaluation device 20 are shown in detail in FIG. 3. Measured values MW, which are supplied, among other things, to a dirt-recognition stage 22, are obtained from the sensor signal S by means of a signal-processing device 21. In this stage a determination is made as to whether or not the breaks are present because of the passage of the wiper. If, during a wiping cycle, less than two signal breaks SE are detected, this is evaluated as the presence of dirt on the windshield, whereas if at least two signal breaks SE are detected, this is evaluated as the absence of dirt on the windshield. If dirt is recognized, as indicated in dashed lines in FIGS. 2B and 2C, the reference value with which the signal is compared in an adjustment device 25 with respect to the state of wetness of the windshield and possible triggering of wiping operation is adapted to the present dirt conditions on the windshield so that, on the one hand, if no corresponding state of wetness is present, an unnecessary wiping operation is avoided and, on the other hand, if wiping operation is necessitated because of raindrops, for example, this is triggered in a suitable manner in that a corresponding control signal ST is formed in a control-signal-generating device 26.

The measured values MW obtained from the sensor signal, for example at intervals of 5 ms, are compared individually to a reference value in the dirt-recognition stage 22, and evaluated with respect to the difference between the respective current measured value MW and the reference value. The reference value is the average value of a plurality of measured values preceding the current measured value, for example four values, and is determined by an averaging device 30. If the difference between the current measured value and the reference value formed in the above manner exceeds a predetermined threshold difference value, the average value is stored in a memory device 32. The surface or area between the average value assumed as the straight, horizontal line and a plurality of consecutive current measured values, for example three, is subsequently calculated. If the calculated surface exceeds a predetermined reference surface value, the signal break SE is evaluated as being present; otherwise it is evaluated as absent. If less than two signal breaks SE are recognized during a wiping cycle, this means that dirt is present on the windshield, as explained above.

Dirt present on the windshield can thus be reliably recognized within a short period of time with the described measures, and wiping operation can therefore be adapted quickly, for example within one wiping process, to the changed conditions.

It will be understood that the above description of the present invention is susceptible to various modifications, changes and adaptations, and the same are intended to be comprehended within the meaning and range of equivalents of the appended claims.

What is claimed is:

1. An apparatus for operating a windshield wiper, comprising:

sensor device for determining the state of wetness of a windshield, the sensor device having a sensor surface and generating a sensor signal having measured values;

an actuating unit for the windshield wiper; and an evaluation device which receives the sensor signal and which generates a control signal for the actuating unit to initiate a wiping process if the difference between a reference value and a current measured value of the sensor signal exceeds a predetermined threshold value, the evaluation device including a dirt-recognition stage which evaluates the measured values to detect signal breaks of the sensor signal caused by the wiping action of the wiper across the sensor surface, and an adjusting device for updating the reference value when the dirt-recognition stage indicates that dirt is present on the windshield.

2. An apparatus as defined in claim 1, wherein the dirt-recognition stage detects a signal break of the sensor signal if the difference between the reference value and the current measured value exceeds the threshold difference value, and wherein dirt is recognized as being present on the windshield if less than two signal breaks are detected during one wiping process.

3. An apparatus as defined in claim 2, wherein the dirt-recognition stage further comprises an averaging device for forming the reference value from a plurality of measured values preceding the current measured value.

4. An apparatus as defined in claim 2, wherein a detected signal break is further evaluated by comparing it to the reference value extending as a straight, horizontal line to find an area value, and wherein the signal break is evaluated as valid if the area value exceeds a predetermined reference area value.

5. An apparatus as defined in claim 4, wherein the dirt-recognition stage further comprises a memory device for storing the average value formed by the averaging device as the reference value as soon as a signal break occurs due to the exceeding of the threshold difference value.

6. An apparatus as defined in claim 4, wherein the area value is calculated using a defined number of measured values.

7. An apparatus as defined claim 2, wherein if less than two signal breaks are recognized, the reference value is adapted to the current signal level of the sensor signal by the adjusting device.

* * * * *